United States Patent [19]

Harris

[11] 3,969,214

[45] July 13, 1976

[54] PERMANENT MAGNET HYDROGEN OXYGEN GENERATING CELLS

[76] Inventor: Mack Harris, 3005 Cumberland, Little Rock, Ark. 72206

[22] Filed: May 31, 1973

[21] Appl. No.: 359,550

[52] U.S. Cl............................ 204/275; 204/129; 204/258; 204/262; 204/266; 204/DIG. 4; 204/DIG. 5
[51] Int. Cl.²..................... C25B 1/02; C25B 1/04; C25B 1/10; C25B 9/00
[58] Field of Search .......... 204/129, 262, 258, 266, 204/275, DIG. 4, DIG. 5, 155, 263, 278, 275; 250/528

[56] References Cited
UNITED STATES PATENTS 1,797,374   3/1931   Smith............................ 204/262 X
3,522,162   7/1970   Davies........................... 204/155 X
3,719,583   3/1973   Ustick............................ 204/149 X
3,767,542   10/1973  Carlson........................... 204/273 X

FOREIGN PATENTS OR APPLICATIONS 1,442,723   10/1969   Germany...................... 204/DIG. 5
401,688     11/1933   United Kingdom................. 204/129

Primary Examiner—John H. Mack
Assistant Examiner—A. C. Prescott
Attorney, Agent, or Firm—Bacon & Thomas

[57] ABSTRACT

A generating cell for hydrogen and oxygen utilizes permanent magnets and electromagnets. Means are provided for removing gases from the electrodes. Mixing chambers are provided for water and the electrolyte used in the cell.

13 Claims, 5 Drawing Figures

PERMANENT MAGNET HYDROGEN OXYGEN GENERATING CELLS

FIELD OF THE INVENTION

The present invention relates to the preparation of hydrogen and oxygen by electrolysis.

SUMMARY OF THE INVENTION

A principal object of the present invention is the preparation of hydrogen and oxygen on a commercial scale more cheaply than has heretofore been practical.

Another object of the invention is the provision of a heat liberating means in a magnetic field for producing hydrogen and oxygen.

A further object of the present invention is the production of hydrogen and oxygen for use in a fuel cell, which may be portable.

BRIEF DESCRIPTION OF THE DRAWINGS

The objects and advantages of the present invention will be fully apparent from the following description when taken in connection with the annexed drawings in which.

BRIEF DESCRIPTION OF A PREFERRED EMBODIMENT

Figure 1:
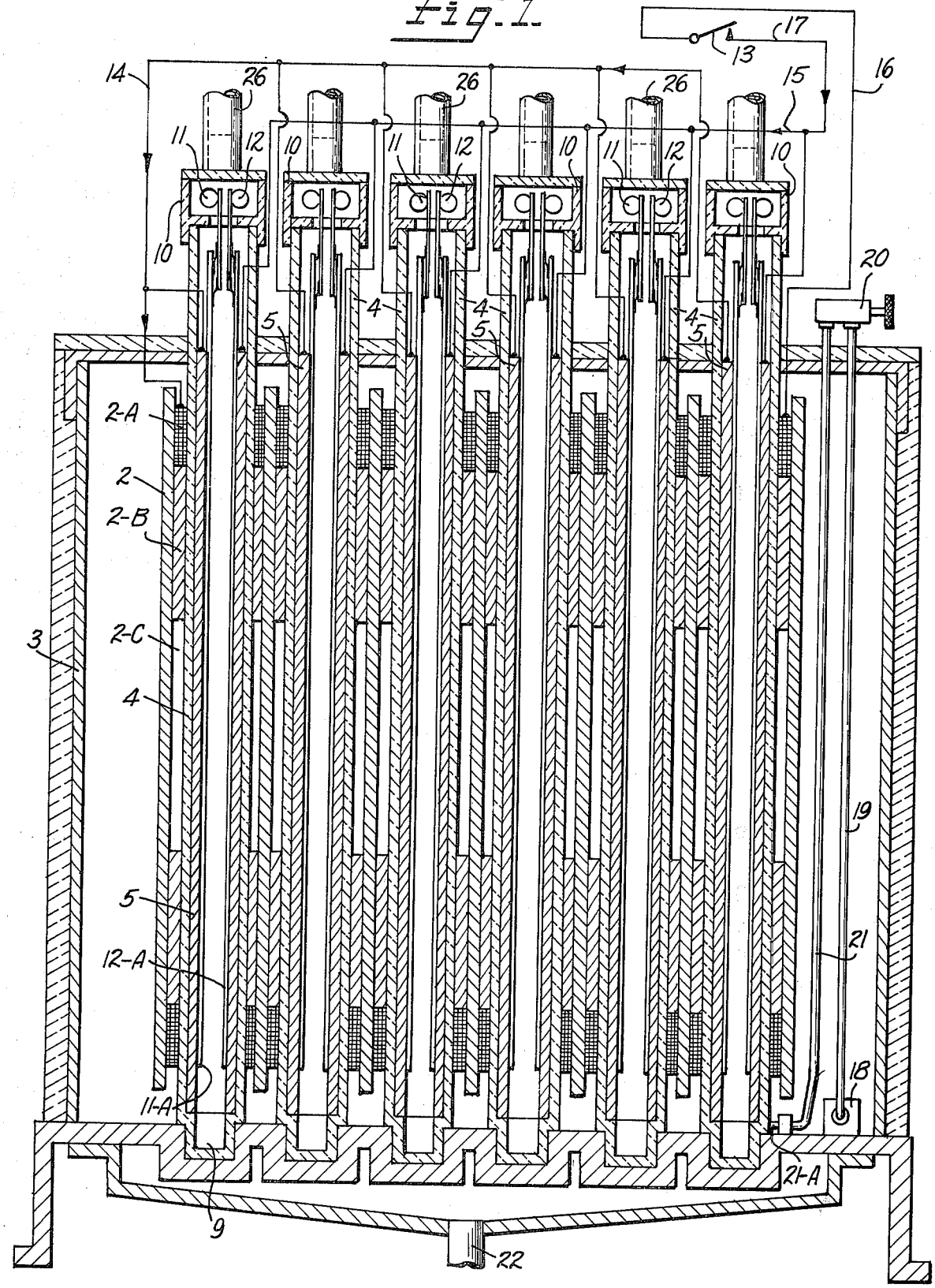
FIG. 1 is an elevation cross-sectional side view of the permanent magnet hydrogen-oxygen generating cells.

Referring in detail to the drawings in which like numerals indicate like parts throughout the views, the permanent magnet hydrogen-oxygen generating cells of the present invention are shown in FIG. 1. Rectangular plate permanent magnets 2 and an electrically conducting coil 2-A, coiled around a core 2-B, made of magnetically permeable material such as iron, having a hollow 2-C therein to let water cool the inside of the electric magnets when current flows through coil 2-A, are connected between cell walls 4. The cell walls may be made of glass or stainless steel that is externally coated with an electrically resistant material. Inside cell-walls 4 an electrode 5 acts as an anode. A separator 6 is connected through the center of the cell and has a porous portion extending two-thirds of the distance to the top of the cells, as shown by the arrowhead on the separator in FIG. 2. An electrode 7, acting as a cathode, is connected to cell wall 4 on the other side of separator 6. Spaces 8 and 9 in the cells are filled to the top of the electrodes with strong sulfuric acid. The electrodes are made of a material that resists strong sulfuric acid. The arrangement described above is shown clearly in FIGS. 1, 2 and 5.

The cells have a removable top 10 so that parts may be replaced when needed, without destroying the cells.

Figure 2:
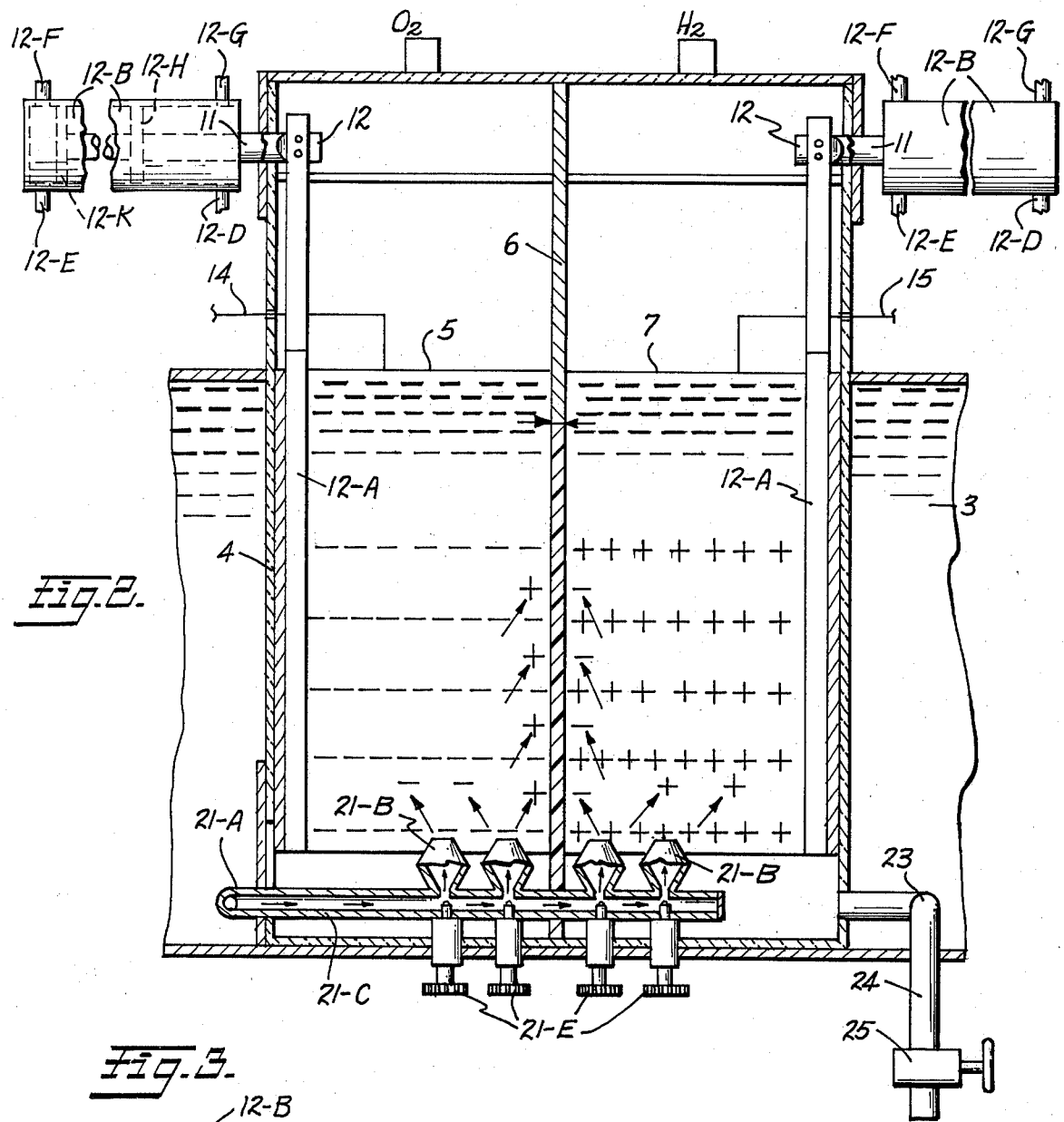
FIG. 2 is an end elevation cross-sectional detail of a cell.
Figure 3:
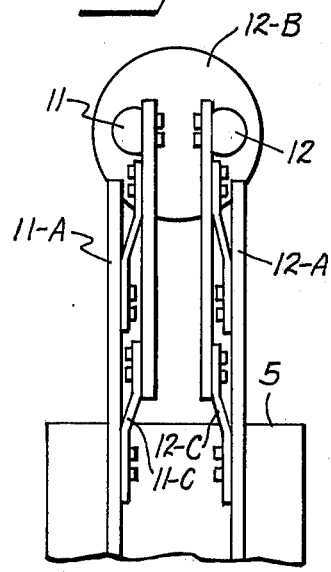
FIG. 3 is a fragment detail of wipers.
Figure 4:
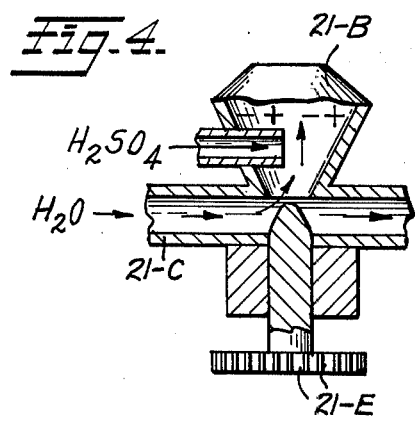
FIG. 4 is an enlarged fragment detail of a water inlet mixing chamber.

Double shafts 11 and 12 are connected to the upper part of wipers 11-A and 12-A with flat springs 11-C and 12-C. The springs hold the wipers against electrodes 5 and 7. Operation of the wipers is similar to that of window wipers on cars. The back and forth movement of the wipers is produced with hydraulic fluid which enters cylinder 12-B through inlet nipple 12-D connected at the end of the cylinder. The fluid pushes piston 12-H in one direction, while outlet nipple 12-F let fluid out to a pump. Second pistons 12-K are connected at the other end of cylinder 12b. To change the direction of motion of the piston fluid enters from a pump through inlet nipples 12-E and pushes piston 12-K, which is connected to piston 12-H by a rod, forcing fluid out of cylinder 12-B through outlet nipple 12-G. Wipers 11-A and 12-A are made of an electric and acid resistant material. The springs that connect the wipers may be coated with acid resistant material. The wipers remove the gases to reduce polarization on parts of the electrodes, as shown in FIGS. 1, 2 and 3.

An electric circuit is completed by electric switch 13. An electric wire 14 is connected by conductor wire to electrodes 5. The end of wire 14 is coiled around magnetically permeable core 2-B, made of material such as iron and is then connected to a wire 16, which is connected to switch 13. Another connector wire 15 is connected to electrodes 7 by conductor wires. A conductor 17 is connected at one end to wire 15. The other end of 17 is connected to switch 13, which when closed completes the electric circuit. The connections are shown in FIGS. 1 and 2.

Figure 5:
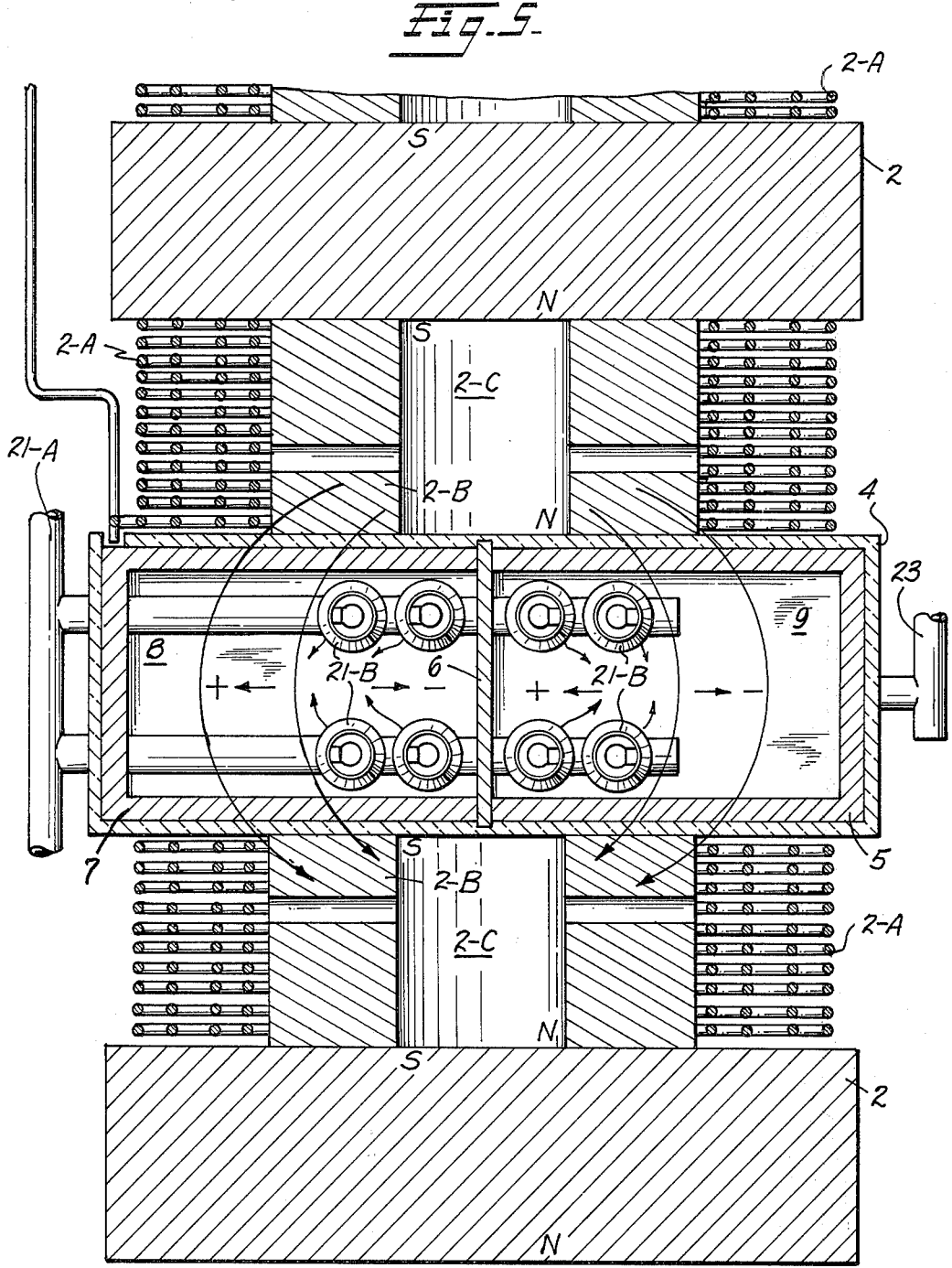
FIG. 5 is a top cross-sectional view of the cell and connecting parts.

A heat insulated case 3 is connected around the cells, and is filled with water [$H_2O$]. A submerging pump 18 is connected in the bottom of case 3, and pumps the water from case 3 through pipe 19. Pipe 19 is connected to a hand valve 20, having an outlet pipe 21. Pipe 21 is in turn connected to pipe 21-A at its other end. The pipes are made of an acid resistant material. Pipe 21-A is connected by tubes 21-C through cell-walls 4. Mixing chambers 21-B are situated on tubes 21-C on each side of separator 6, as shown in FIGS. 2 and 5. The mixing chambers are tapered in shape. The openings at the bottom of mixing chambers 21-B are needle sized, having valves 21-E connected so as to close the needle sized openings. The valves adjust the openings so that water that is pumped through tubes 21-C will enter the mixing chambers in the form of droplets. The cells each are large enough to hold 4 pounds of $H_2SO_4$ when filled to the top of the electrodes, and the valves are adjusted to let 4 pounds of water [$H_2O$] into each cell in every hour. The heat liberated in mixing chambers 21-B increases the acceleration of the ions out of the mixing chambers. The ions' path cuts across the magnetic lines of force and is shown in FIGS. 2 and 5. The magnetic lines of force are produced by the permanent magnet NS. The ions which are so affected move as shown by the short arrowheads in FIG. 5. A current will flow through wire 14 coiled around core 2-B making an electric magnet, which will produce a stronger magnetic field, thereby affecting more ions. At electrode 5 the [$HSO^-_4$]-[$SO^{--}_4$] and [$OH^-$] ions lose electrons and react with each other and with the $H_2O$ to form acid [$H_2SO_4$] again and to set free oxygen [$O_2$]. At electrode 7 the hydrogen ions take on electrons and rise to the surface as bubbles of hydrogen [$2H^+ + 2^- \rightarrow H_2$] and heat energy is absorbed.

Burner 22 adds heat energy to the cells. The heat that is lost through the side walls of the cells is absorbed by water [$H_2O$] in case 3, which insulates the case. Heat lost by coil 2-A is also absorbed by [$H_2O$] in case 3.

The burner 22 is heat controlled. If the $H_2SO_4$ becomes too diluted to generate the needed heat, it may be drained from the cells through tube unit 23 connected to pipe 24 and valve 25. The cells can be refilled with $H_2SO_4$. Diluted $H_2SO_4$ may be condensed by connecting long copper tubes 26 over the nipples provided for the passage of $O_2$ and $H_2$. The $H_2SO_4$ may be heated by burner 22 to boil the water. After evaporation, the [$H_2SO_4$] will condense in tubes 26. The arrangement is shown in FIG. 1.

After the [$H_2SO_4$] becomes concentrated, the burner 22 is connected to a heat control and tubes 26 are removed. The nipples are connected for the passage of $O_2$ and $H_2$ once again.

The $O_2$ and $H_2$ passages may be connected to pass through a hydrogen-oxygen fuel cell to produce electric energy, which might be used to power a vehicle.

In one embodiment of the invention, the inside of the cells are three-fourths of an inch deep, 2 feet high and 6 inches wide.

A ferromagnetic substance may be used for the permanent magnets.

Those ions which lose their Kinetic energy as a result of collisions with other molecules are drawn to the electrodes by the potential difference produced by the ions, which are collected on the electrodes.

The heat liberated in the mixing chamber may keep the temperature therein at more than 100°C.

The heat liberated plus the heat added by the burner will equal the heat absorbed by endothermic reactions.

A heat liberating means within the cells has thus been disclosed, for producing hydrogen and oxygen.

The burner is shut off when the temperature of the $H_2SO_4$ is 50°C in order to save fuel and operating cost. At the lower temperature of $H_2SO_4$ heat is absorbed faster, from the burner or an electric heating unit, than would be absorbed at a higher temperature.

The heat lost to $H_2SO_4$ as a result of collisions is conducted to the water $H_2O$ stored in the case around the cells to be pumped back into the cells. The $H_2SO_4$ molecules that conduct lost heat will be neutral molecules. A very small amount of heat will be lost at the top of the cells.

The heat lost by producing hydrogen-oxygen with this invention is minimized.

It will be understood that the mixing of $H_2O$ and $H_2SO_4$ in this invention could save in the cost of producing $H_2$ and $O_2$. Water [$H_2O$] from another water tank may enter case 3 as water is pumped out.

It is the Kinetic energy produced by heat of formation that is converted into electric energy within a magnetic field, and in turn the electric energy increases the magnetic field, which increases the production of $H_2$ and $O_2$.

Having thus disclosed my invention, I claim and desire to secure by Letters Patent:

1. A gas generating device comprising:
    a. a cell;
    b. first and second electrodes disposed within said cell, said electrodes being electrically connected;
    c. means for producing magnetic flux within said cell, said flux acting substantially along a single direction;
    d. a mixing chamber having a first input port for feeding sulfuric acid thereto and a second input port for feeding water thereto;
    e. said mixing chamber having an interior portion for receiving said sulfuric acid and water from said first and second ports respectively;
    f. said mixing chamber having an outlet port in communication with said cell for releasing the resultant mixture into said cell, and
    g. said mixing chamber being oriented for releasing said resultant mixture in a direction substantially perpendicular to the direction of said magnetic flux whereby the ions emanating from said mixing chamber are urged toward said first and second electrodes.

2. A gas generating cell as recited in claim 1 further comprising a removable top for easy replacement of cell components.

3. A gas generating cell as recited in claim 1 further comprising wiping means adjacent said electrodes for removing by-products of activity occurring within the cell from said electrodes.

4. A gas generating cell as recited in claim 1 wherein said wipers are reciprocatingly operated by hydraulic means.

5. A gas generating cell as recited in claim 4 wherein said wipers are constructed of electrically insulating and acid resistant material.

6. A gas generating cell as recited in claim 5, wherein the walls of said cell are made of glass.

7. A gas generating cell as recited in claim 5, wherein the walls of said cell comprise an electrically insulating material coated on stainless steel.

8. A gas generating cell as recited in claim 1 further comprising heating means for providing energy to the mixture produced by said mixing means.

9. A gas generating cell as recited in claim 8 further comprising means for reconcentrating said mixture, said heating means providing energy to said reconcentrating means.

10. A gas generating means as recited in claim 9 further comprising:
    a. means surrounding said gas generating cell for containing said water, whereby the water insulates the cell;
    b. pumping means, disposed adjacent to said cell, for propelling said water to said mixing chamber.

11. A gas generating cell as recited in claim 1 wherein said magnetic flux producing means comprise:
    a. a magnet adjacent said cell;
    b. magnetically permeable material;
    c. electrically conductive material wound around said permeable material, and disposed adjacent to said cell;
    d. electrical conductors connected to said wound conductive material and to said electrodes, forming an electric circuit therewith.

12. A gas generating cell as recited in claim 1 wherein said mixing chamber further comprises means for adjusting the flow of said water into said cell.

13. A gas generating cell as recited in claim 1 further comprising means for separating gases produced at said first and second electrodes.

* * * * *